United States Patent
Lim et al.

[11] Patent Number: 5,956,137
[45] Date of Patent: Sep. 21, 1999

[54] IN-LINE PROCESS MONITORING USING MICRO-RAMAN SPECTROSCOPY

[75] Inventors: Eng Hua Lim; Kin-Leong Pey; Harianto Wong; Kong Hean Lee, all of Singapore, Singapore

[73] Assignees: Chartered Semiconductor Manufacturing Ltd.; National University of Singapore, both of Singapore, Singapore

[21] Appl. No.: 09/186,389

[22] Filed: Nov. 5, 1998

[51] Int. Cl.[6] ............................. G01J 3/44; H01L 21/00
[52] U.S. Cl. ............................. 356/301; 438/305
[58] Field of Search ..................... 356/301, 303, 356/445, 432; 438/305, 306; 257/457–460

[56] References Cited

U.S. PATENT DOCUMENTS

| | | | |
|---|---|---|---|
| 5,017,007 | 5/1991 | Milne et al. | 356/301 |
| 5,286,678 | 2/1994 | Rastogi | 437/200 |
| 5,744,395 | 4/1998 | Shue et al. | 438/305 |
| 5,844,684 | 12/1998 | Maris et al. | 356/432 |

*Primary Examiner*—Robert H. Kim
*Assistant Examiner*—Layla Lauchman
*Attorney, Agent, or Firm*—George O. Saile; Rosemary L.S. Pike

[57] ABSTRACT

An in-line non-destructive method is described for identifying phases in a micro-structure such as a fine line pattern. This is accomplished by observing the Raman spectrum of the micro-structure. A particular application is a silicide layer, prepared using the SALICIDE process, where the crystal phases before and after Rapid Thermal Anneal are often different. This is reflected by the appearance of different lines in the Raman spectra so that the fraction of each phase can be determined. If the silicide layer agglomerated during the anneal, this is also detected by the Raman spectrum. The method has been used successfully down to line widths of about 0.35 microns.

20 Claims, 2 Drawing Sheets

IN-LINE PROCESS MONITORING USING MICRO-RAMAN SPECTROSCOPY

FIELD OF THE INVENTION

The invention relates to the general field of materials characterization with particular reference to Raman spectroscopy as applied to microstructures.

BACKGROUND OF THE INVENTION

A light ray incident on a material will experience scattering when it encounters inhomogeneities in its path. These could be in the form of dust particles, local fluctuations in density, or even individual molecules (Rayleigh scattering), the general phenomenon being referred to as the Tyndall effect. The Tyndall effect can be explained in terms of classical physics and includes the proviso that the scattered light has the same wavelength as the incident ray.

In the Raman effect, which is a non-classical quantum effect, a small fraction of the scattered light is found to have a wavelength that is slightly longer than that of the incident ray. Assuming the latter to be monochromatic, a Raman spectrum, which is characteristic of the material being illuminated, can be obtained by analyzing the wavelength of light scattered from the material. The Raman lines are found to always be displaced from that of the incident ray by a fixed number of wave numbers (reciprocal of the wavelength), regardless of the incident ray's wavelength. In a solid, the Raman spectrum represents energy differences between vibrational states of the crystal lattice, making it unique with respect to that particular lattice.

To obtain the Raman spectrum, a high intensity monochromatic beam (i.e. a laser) is directed at the material under investigation and light emerging in a backscattered direction relative to that of the laser is analyzed. Although light scattered in any direction could in principle be used, the backscattered direction is preferred because it minimizes any interference by the direct beam.

The present invention is an application of the Raman effect to deal with a particular problem that often arises in the course of manufacturing integrated circuits, namely determining whether a material that has been subjected to a phase changing stimulus (most commonly a Rapid Thermal Anneal or RTA) is, in fact, in the desired phase. This can be a problem for two reasons—the amount of material involved is very small and the process window for the RTA (or other procedure designed to bring about the phase change) is very narrow.

The present invention, while of a general nature, is particularly concerned with monitoring a specific process, namely the SALICIDE (self-aligned silicide) process. As will be described in further detail below, said process ends with an RTA whose purpose is to change the crystal structure of a metal silicide to a different structure having a significantly lower resistivity. The procedure for monitoring the success (or failure) of this step, as taught in the prior art, is to measure the resistivity (or rather sheet resistance) directly. However, when the area concerned becomes very small, such a measurement cannot be performed in-line. It becomes particularly difficult when the area in question is not continuous but is made of many smaller areas, such as in a line pattern. Thus, this measurement must, at best, be made on an area adjacent to the area of interest and at worst it becomes a destructive technique, requiring the sacrifice of one of the chips of the wafer being processed.

The SALICIDE process, specifically using titanium, is described by Rastogi (U.S. Pat. No. 5,286,678 Feb. 1994) who monitors the effect of the phase transforming RTA through measurement of the average sheet resistance of the titanium silicide.

The use of the Raman effect to study the structure of a thin layer in the form of an adsorbate is described by Milne et al. (U.S. Pat. No. 5,017,007 May 1991). The principle thrust of this invention is how to effectively increase the adsorbate area, and hence the intensity of the Raman signal, by careful preparation of the substrate onto which the adsorbate will attach itself. They accomplish this by depositing a layer of silver micro needles onto the substrate. This has no bearing on the present invention where the type of surface to be Raman analyzed may not be altered.

SUMMARY OF THE INVENTION

It has been an object of the present invention to provide an in-line non-destructive method for identifying the crystal structure of a layer in a small area.

Another object of the invention has been that said method be suited to determining if the correct phase is present at the end of a SALICIDE procedure.

A particular object of the invention has been to provide an in-line non-destructive method for determining the amount of the C54-$TiSi_2$ phase in a layer of titanium silicide present in a fine line pattern after a titanium based SALICIDE procedure.

These objects have been achieved by observing the Raman spectrum of the layer within the area in question. In a silicide layer prepared using the SALICIDE process, the crystal phases before and after Rapid Thermal Anneal are found to be different. This is reflected by the appearance of different lines in the Raman spectra so that the fraction of each phase can be determined. If the anneal temperature was too high the silicide layer agglomerates. This can also be detected in the Raman spectrum. The method is well suited to identifying phases in a microstructure such as a fine line pattern and has been used successfully down to line widths of about 0.35 microns.

DESCRIPTION OF THE PREFERRED EMBODIMENTS

Although the present invention is of a general nature, being suitable for the in-line monitoring of many microstructures, regardless of how they were formed, it will be described in terms of a SALICIDE process as that is the application concerning which we have the most experience.

Figure 1:
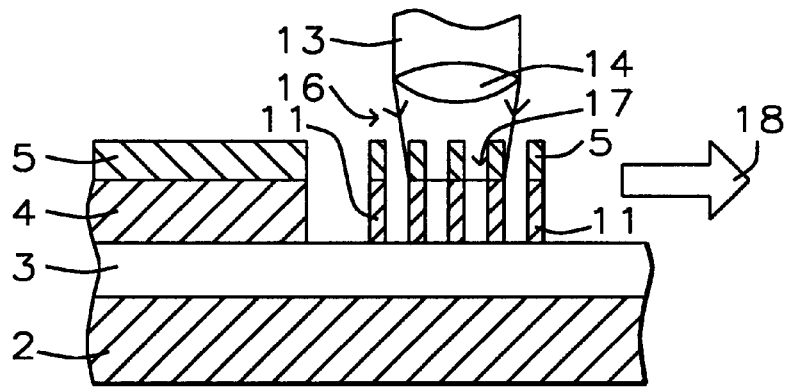
FIG. 1 shows the basic apparatus used to implement the method of the present invention.

Referring now to FIG. 1, the SALICIDE process begins at a silicon oxide surface 3 (usually part of an integrated circuit and lying on a silicon substrate 2) on which has been deposited polysilicon layer 4. The latter has been patterned and etched into multiple areas of polysilicon separated one from another by areas of silicon oxide. A common form for these multiple areas is a line pattern made up of lines such as 11. Typically, these lines would be between about 0.2 and 1 microns wide and be separated from one another by between about 0.3 and 1 microns.

The purpose of the SALICIDE process is to be able to selectively contact the polysilicon areas, as distinct from any exposed areas of silicon oxide. To this end, a layer of a metal such as titanium, tungsten, cobalt, nickel, or a nickel alloy is deposited over the entire structure, to a thickness between about 100 and 400 Angstroms. This is followed by a first RTA wherein the structure is rapidly heated and cooled for a brief time period. In the case of titanium this is a temperature between about 680 and 750° C. for between about 30 and 60 seconds.

As a result of the RTA the metal reacts with the polysilicon and is converted to a layer of silicide. A selective etch is then used to remove all unreacted metal, resulting in a layer of silicide 5 in all the polysilicon areas, and nowhere else.

If this silicide layer had a sufficiently low electrical resistivity, the SALICIDE process would end here. In practice, however, it is found that the crystal phase that forms as a result of the first RTA has a relatively high resistivity (around 60–90 ohm-cm. for titanium silicide). It is, however, known that an RTA at a somewhat higher temperature (between about 850 and 900° C. for between about 10 and 30 seconds for titanium) results in a different crystal structure that has a significantly lower resistivity (about 15–25 ohm-cm.).

It turns out that the process window for the second RTA is extremely narrow—if too little energy is supplied the transformation to the low resistivity phase is incomplete while if too much energy is supplied the silicide layer will agglomerate and break up into a non-continuous film having very high sheet resistance.

It is thus essential to be able to determine, once the second RTA has been performed, whether the low resistivity phase was formed, whether any of the high resistivity phase remains, and whether any agglomeration has taken place. The method of the present invention provides an answer to all three questions in an in-line non-destructive manner.

Continuing our reference to FIG. 1, we show there a microscope 13 through which the laser beam that will be used to generate the Raman spectrum is directed. After passing through objective lens 14 (typically a 50× lens, but other magnifications such as 70× or 100× would also still work) laser beam 16 has been focussed down to spot 17 which has a diameter between about 1 and 2 microns. After arriving at the area of silicide illuminated by the spot, light is scattered in all directions including 18 which represents the backscattered direction relative to the laser. Included in this scattered light are the Raman lines that are key to the method of the present invention.

Figure 2:
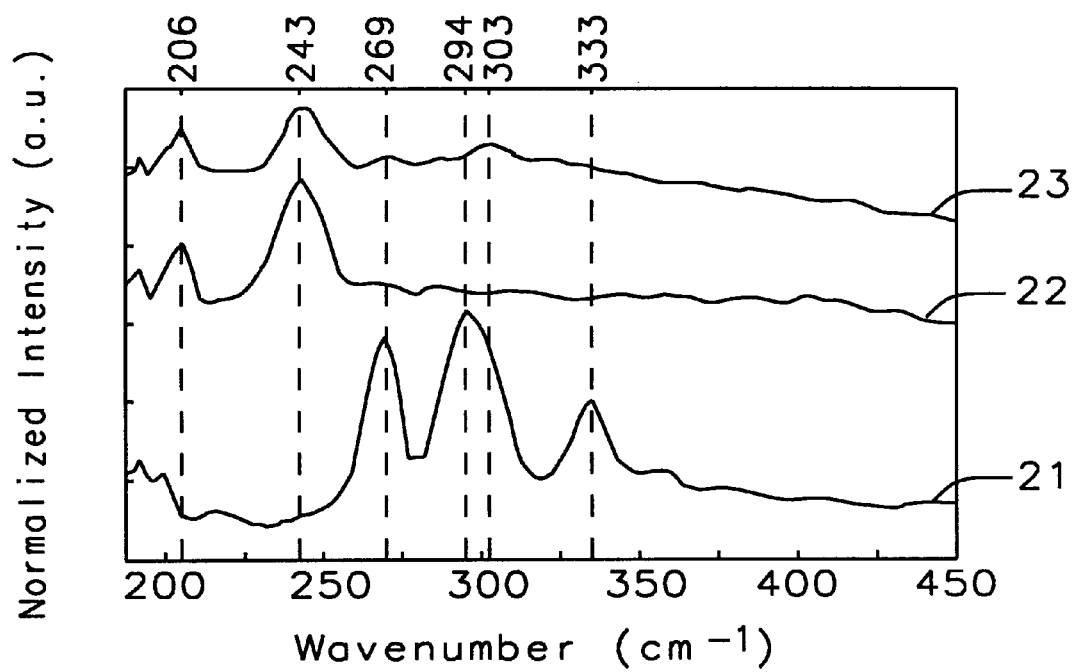
FIG. 2 compares the Raman spectra of the C49-$TiSi_2$, the C54-$TiSi_2$, and the C54-$TiSi_2$ agglomerated phases.

To resolve the Raman lines, backscattered light 18 is passed through a spectrophotometer (not shown). Several examples of the Raman lines, for the titanium silicide system, are shown in FIG. 2. What is seen is a plot of normalized intensity in arbitrary units (a.u.) vs. displacement (in number of waves per cm.) away from the laser. For the latter we have used both HeNe and near infrared lasers having wavelengths of 633 nm and 782 nm respectively.

In FIG. 2, curve 21 is for the high resistivity phase that is present after the first RTA. It is known as the base-centered orthorhombic C49 $TiSi_2$ phase. It can be seen to have sharp well defined peaks at 269, 294, 333 $cm^{-1}$. Curve 22 is for the low resistivity phase that should be present after the second RTA. It is known as the face-centered orthorhombic C54 $TiSi_2$ phase. It can be seen to have sharp well defined peaks at 206 and 243 $cm^{-1}$. Curve 23 is for the agglomerated phase that is obtained if the second RTA was at too high a temperature. It can be seen to also be face-centered orthorhombic C54 $TiSi_2$ but its peaks are much broader and less intense than seen in curve 22. Additionally, a weak peak, associated with the agglomerated film and not present in the unagglomerated film, can be seen at 303 $cm^{-1}$.

As mentioned earlier, non-destructive evaluation of the various $TiSi_2$ phases using sheet resistance measurements becomes increasingly more difficult as the area under scrutiny decreases. In integrated circuits, line width is an important parameter which, while affecting the efficacy of the method of the present invention, does not make it ineffective. This can best be seen in FIG. 3 which is a normalized plot of Raman line intensities (in a.u.) from lines associated with the C54 (low resistivity) phase, as a function of the RTA temperature.

Figure 3:
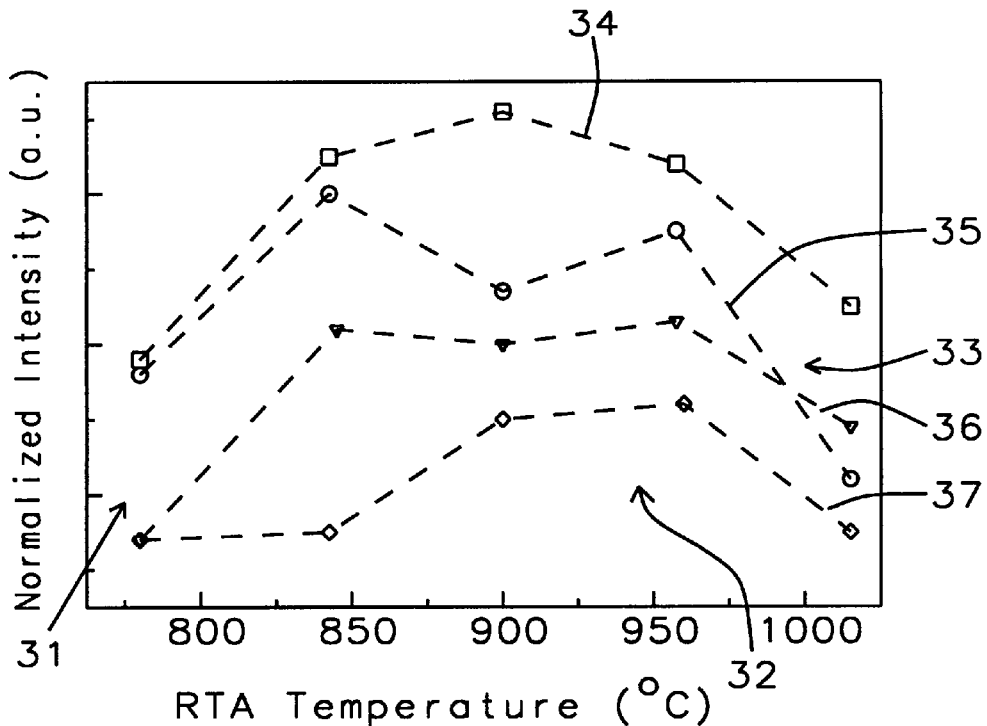
FIG. 3 is a plot of Raman line intensities for the C54-$TiSi_2$ phase as a function of RTA temperature, for lines of different widths.

In FIG. 3, curve 34 is for a relatively large (not a line) polysilicon area, curve 35 is for a 1 micron polysilicon line, curve 36 is for a 0.6 micron polysilicon line, and curve 37 is for a 0.35 micron polysilicon line. The plot can be seen to be divided into three regions. In region 31, the C54 phase is seen to be rapidly growing in intensity as the RTA temperature is raised. In region 32, the C54 intensity levels off as the film becomes almost pure C54, while in region 33 the C54 intensity starts to drop as the incidence of agglomeration begins to increase.

Figure 4:
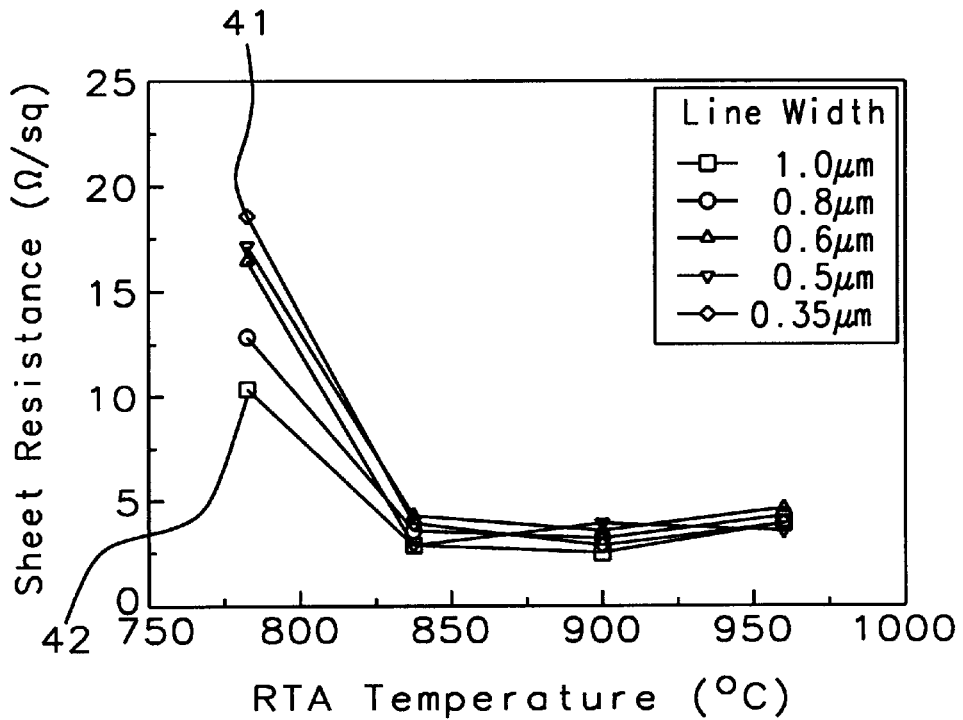
FIG. 4 is a plot of sheet resistance as a function of RTA temperature, for lines of different widths.

For comparison, in FIG. 4, sheet resistance has been plotted over a similar range of RTA temperatures. The rise in sheet resistance beyond the agglomeration point is so steep that it is completely off the scale. As in FIG. 3, the plot is for a selection of different line widths. As can be seen, the decrease in sheet resistance, as the optimum RTA temperature is approached, is greatest for the 0.35 micron lines (curve 41) and least for the 1.0 micron lines (curve 42). This serves to further emphasize the importance of being able to perform non-destructive measurements on the very fine lines, something made possible by the present invention.

While the invention has been particularly shown and described with reference to the preferred embodiments thereof, it will be understood by those skilled in the art that various changes in form and details may be made without departing from the spirit and scope of the invention.

What is claimed is:

1. A method of in-line monitoring of a micro-structure, comprising:

providing, in the form of a line pattern, a layer of a material having a crystal structure;

in a first direction, directing a laser beam, having a wavelength, onto the line pattern, as a spot having a diameter;

performing a spectral analysis of light emerging from the line pattern in a second direction that is backscattered relative to said first direction, thereby obtaining a Raman spectrum; and from said Raman spectrum, identifying said crystal structure.

2. The method of claim 1 wherein the material is a metal silicide.

3. The method of claim 2 wherein the material is selected from the group consisting of titanium, tungsten, cobalt, nickel, and nickel alloys.

4. The method of claim 2 wherein the material is titanium silicide having the C54 crystal structure.

5. The method of claim 4 wherein the step of identifying said crystal structure further comprises detection of lines in said Raman spectrum displaced from the laser wavelength by 206 and 243 waves per cm.

6. The method of claim 1 wherein the laser is a HeNe laser having a wavelength of 633 nm or a near infrared laser having a wavelength 782 nm.

7. The method of claim 1 wherein the diameter of the spot is between about 1 and 2 microns.

8. The method of claim 1 wherein the line pattern further comprises lines having a width between about 0.2 and 1 microns separated by between about 0.3 and 1 microns.

9. The method of claim 1 wherein the step of directing the laser beam further comprises passing the beam through a microscope.

10. An in-line method of monitoring a SALICIDE procedure, comprising the sequential steps of:

provifing a layer of silicon oxide on a silicon substrate;

depositing a layer of polysilicon on said layer of silicon oxide;

patterning and etching the polysilicon to form a structure comprising multiple areas of polysilicon separated one from another by areas of silicon oxide;

depositing a layer of a metal over the structure;

subjecting the structure to a first RTA whereby the metal reacts with the polysilicon to form a layer of a metal silicide having a first crystal structure;

removing all unreacted metal;

subjecting the structure to a second RTA whereby the metal changes to a second crystal structure;

in a first direction, directing a laser, having a wavelength, onto an area of the metal silicide, as a spot having a diameter;

performing a spectral analysis of light emerging from said area of metal silicide in a second direction that is backscattered relative to said first direction, thereby obtaining a Raman spectrum; and from said Raman spectrum, determining the relative amounts of the first and second crystal structures present in said area of metal silicide and whether agglomeration has occurred.

11. The method of claim 10 wherein the metal is selected from the group consisting of titanium, tungsten, cobalt, nickel, and nickel alloys.

12. The method of claim 10 wherein the metal silicide is titanium silicide and the first crystal structure is C49 and the second crystal structure is C54.

13. The method of claim 12 wherein the relative amount of the C49 structure is determined by measuring line intensities in the Raman spectrum displaced from the laser wavelength by 269, 294, and 333 waves per cm. and the relative amount of the C54 structure is determined by measuring line intensities in the Raman spectrum displaced from the laser wavelength by 206 and 243 waves per cm.

14. The method of claim 12 wherein the first RTA further comprises heating the structure at between about 680 and 750° C. for between about 30 and 60 seconds.

15. The method of claim 12 wherein the second RTA further comprises heating the structure at between about 850 and 900° C. for between about 10 and 30 seconds.

16. The method of claim 10 wherein the laser is a HeNe laser having a wavelength of 633 nm or a near infrared laser having a wavelength 782 nm.

17. The method of claim 10 wherein the diameter of the spot is between about 1 and 2 microns.

18. The method of claim 10 wherein the layer of metal silicide is in the form of lines having a width between about 0.2 and 1 microns separated by between about 0.3 and 1 microns.

19. The method of claim 10 wherein the first crystal structure has an electrical resistivity that is between about 3 and 6 times that of the second structure.

20. The method of claim 10 wherein the step of directing the laser further comprises passing the laser through a microscope.

* * * * *